Patented June 12, 1934

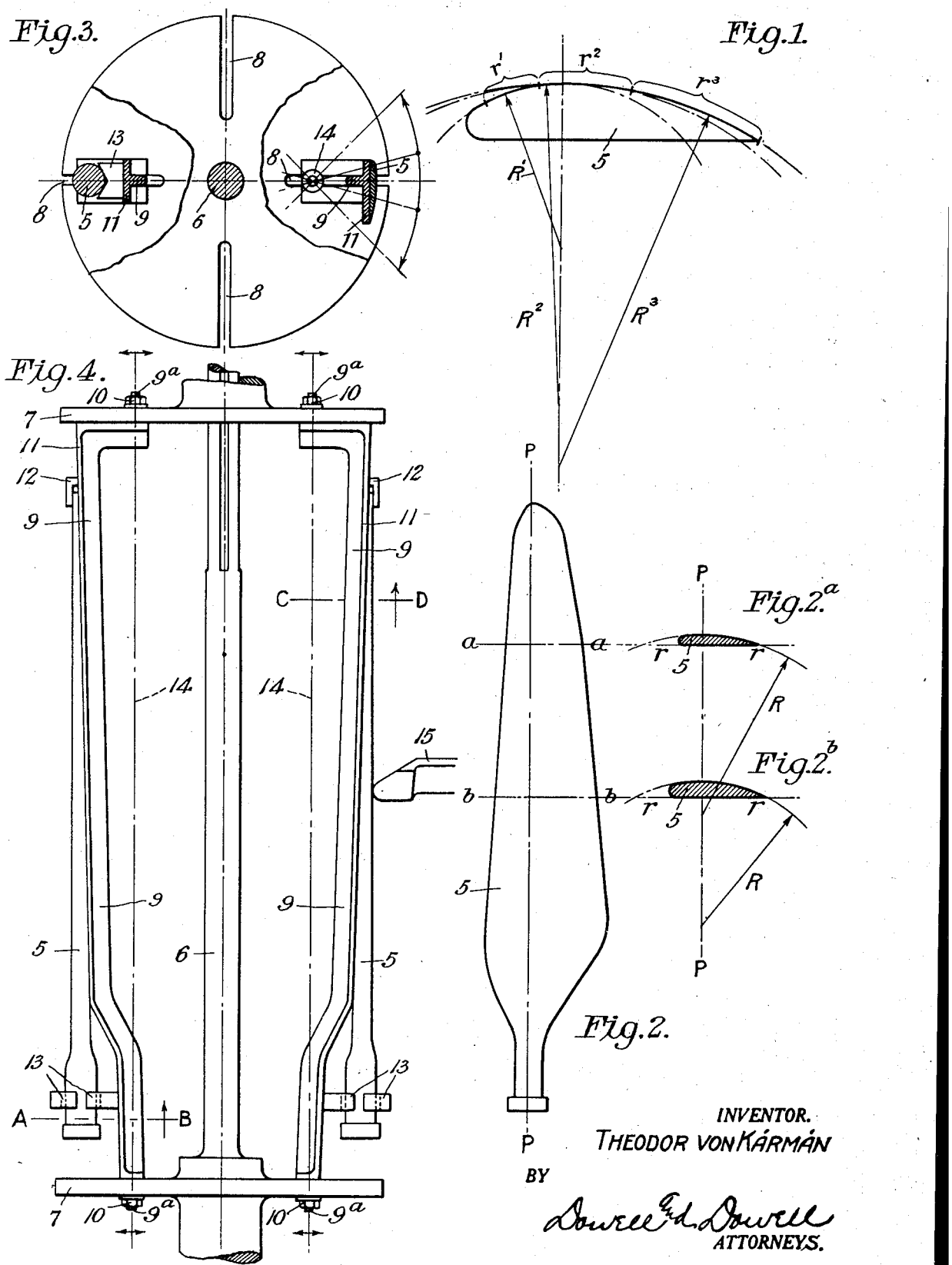
INVENTOR.
THEODOR VON KÁRMÁN

1,962,794

UNITED STATES PATENT OFFICE 1,962,794

PROCESS AND APPARATUS FOR MAKING AERIAL PROPELLERS

Theodor von Kármán, Aachen, Germany

Application April 27, 1931, Serial No. 533,319
In Germany April 1, 1930

10 Claims. (Cl. 82—40)

This invention relates to aerial propellers with reference more especially to those of metal and aims to provide a novel form of blade and method and machine for making the same.

In the making of aeroplane propeller blades and the like of metal, a common practice at present is first to form them without any pitch and then to impart or obtain the proper pitch at different points therealong by twisting. For this purpose the body of the blade must be so machined as to give it the known most favorable aerodynamic shape cross-sectionally from hub to tip and simultaneously decrease or graduate its thickness toward the tip.

This has heretofore been done by the use of special milling or planing machines necessary for the purpose, or else by machinery working on the bodies in accordance with a template. The second-mentioned process however, which may be carried out by hand with a file and chisel instead of machinery, necessitates constant supervision and careful comparison with the prescribed profile from point to point or from stage to stage along the blade length. The so-called copying process therefore requires an exact template for every section (between such parts) of the blade to be produced and the process consequently is expensive, making the provision of special apparatus for each type of blade essential.

The present invention intended to simplify the forming of the blades is characterized by attaining or basing the curvature surfaces of the different sections from hub to tip mainly or to a great extent upon arcs of one or more circles and simultaneously arranging for the greatest thickness to be unsymmetrically along the center of greater depth of the blade. Such arrangement is preferably so made that the parts of greatest thickness will lie in a single radial plane.

It is also characterized by arranging the blade-bodies so as to be surface machined as parts of the walls of one or more cylinders or conical surfaces, while the variable thickness and width of the blades are preferably produced by supporting them during machining in arrangement at an angle to the axis of rotation. This angle may be and is advantageously variable. Furthermore, the blade-bodies set with their inner surfaces at the angle with respect to the axis of rotation may be arranged to be adjustable about a second axis so that a plurality of different cylindrical or conical surface sections may be cut therein. The last arrangement may be so fixed that a turning or twisting about the said second axis can be automatically varied during a rotational movement.

The invention will be best understood by further description with reference to the attached drawing illustrating practicable embodiments of an aerial propeller and machine for making the same.

In said drawing:

Fig. 1 represents a cross-section of a blade the curvature of which is attained or made in accordance with the invention;

Fig. 2 is a longitudinal elevation of the blade of which the cross-sectional shape at two different points is represented at the side;

Figs. 2a and 2b represent the cross-sectional shape of the blade respectively on the lines a—a and b—b of Fig. 2;

Fig. 3 is an end view of a machine carriage on which the blade is formed, parts thereof being broken away to reveal sections taken respectively on the lines A—B and C—D of Fig. 4; and Fig. 4 is a longitudinal or side elevation of said carriage.

Referring to Fig. 1, the illustrative cross-section of a blade 5 is shown to have its curvature or cambered surface at one (the upper or outer) side based or laid out upon three successive and different curved lines, being arcs $r^1$, $r^2$ and $r^3$, respectively of three circles of different radii $R^1$, $R^2$, $R^3$, centered tangentially one within another on the same line L as indicated. This profile or compound curvature, as the applicant has found by exhaustive experiment, is the full equivalent aerodynamically of the best known profiles for aeroplane blades, but is materially simpler to make because the joined peripheral lines are formed on circular arcs.

If the opposite (lower or inner) side surface be made flat as here represented, there will then be only a very small portion of the whole periphery or sectional contour of the blade which does not consist of straight lines or circular arcs, so that very little special work in addition to the machining described presently will be necessary to completion. It is of course possible to make said opposite side correspond to a suitable curve instead of flat if desired. In fact, it might be formed on one or more circular arcs just like the upper or first-mentioned surface if an innerside cambering of the blade were desired.

Fig. 2 exemplifies the longitudinal shape of the propeller having the profile or cambered surface as above described. In these last-mentioned views, only which gradually decreases in degree from hub to tip as shown by the cross-sectional representations of Figs. 2a and 2b at different points, the general curvature of the upper surface has been indicated, this being done by the arcs r—r of single circles having radii R. The arcs of the curvature in this case are so related that the thickest part of the profile or blade body made originally without pitch lies in a radial plane P—P. This result is attained by reason of the fact that the centers of the circular arcs lie radially or axially in this P—P plane. It accordingly follows that the center of pressure as well as the center of gravity of the blade body lies in or approximately upon the P—P plane, so that in an aerial propeller made this way, torsional moments about the axis of gravity of the blade sections are eliminated, or else are reduced to a very low intensity.

Figs. 3 and 4 somewhat diagrammatically illustrate a machine for producing blades of the form described. Said machine embodies a rotatably supported shaft 6 adapted to be driven by any appropriate source of power, upon which two annular flange-plates 7 are centrally mounted in spaced relation. These plates have radial slots 8 (see Fig. 3) in quadrant disposition, in which tie-rod supports 9 are adjustably arranged by means of threaded ends 9ª extending therethrough with securing nuts 10.

The unformed blade bodies (5) in plurality number are fastened against cross-flange portions 11 of these supports 9 by a clamping means such as represented at 12 and 13. By shifting the ends of said supports within the radial slots (8), it is possible to bring the outer surfaces of the blade bodies into parallel relation with the axis of the shaft 6, while the inner surfaces thereof will lie at an angular relation to said shaft axis. Thus the outer surfaces of the bodies to be machined are made to form longitudinal sections of a cylindrical body or drum around the shaft, so that any desired thickness or depth of the blades can be obtained by machining, without working upon their inner surfaces. It is of course obviously possible as well to adjust the blade bodies to an angular relation to the shaft and thereby form a substantially conical body therearound.

The supports 9 are adapted to be turned or rocked upon their own axes 14 so as to transversely tilt and thereby project or expose the outer surfaces of the blade bodies thereon for greater facility in cutting them down to curvature form on the successive arcs of the three circles as described with reference to Fig. 1. For this purpose of course the bolts 10 tightly clamp and hold the supports rigid during the cutting action of a cutter-tool 15, which is movable lengthwise of this cylindrical carriage for the blade bodies and works thereon successively in a complete rotation of the carriage with each adjustment. In a plurality of revolutions accordingly, the several different arcuate cuts may be made on all the blades alike. For example, in the first revolution, the arc $r^1$ of circle $R^1$ may be cut, in the second the arc $r^2$ of circle $R^2$ and the third the arc $r^3$ of circle $R^3$, a rocking adjustment of the blade supports being of course necessary for each one of the different arc cuts.

If desired of course, the supports 9 may be made to rock automatically to proper tilting position, by means for example of a cam, so as to permit the three (or more) arc cuttings to be made in each blade body with a single rotation of the carriage. In other words, on finishing the cutting of the arc $r^1$, the cam may be made to tilt the support for cutting the arc $r^2$ and so on for each blade of the series successively. It will be understood that the cutting-tool 15 has a back and forth movement in relation to the blades and that the angular setting or tilt of the supports 9 with respect to said tool is necessary for the cutting of each arc along a section or length thereof. As above described, the appropriate disposition of the blade bodies for each cutting may be made either by hand or automatically.

It will be obvious that a possible modification of the forming machine would be to have the cutting tool mounted to revolve around the blade bodies held stationary rather than to make said bodies revolve in relation to said tool as here shown. Another modification would be to employ a plurality of cutting tools working on the blades successively or simultaneously. It will be appreciated moreover that the forming process according to this invention makes it possible to cut a plurality of blade bodies on the described machine, which latter may operate in a single or plurality of revolutions to accomplish the desired result according to its organization within the scope of the invention. It would be possible furthermore to at the same time produce several propellers of different pitches and different cambered surfaces. Thus it will be seen that the invention eliminates the necessity of supervising the cutting of the blade contours according to template, because the thickness and curvature of the same are predetermined according to desire or preference by appropriately setting the cutting tool and supports for the blades. The process and machine furthermore permit an extensive variation of the dimensions with respect to diameter, thickness, width of blade, pitch etc. Finally, the machine and process of formation provide for high speed operation and rapid production.

While I have described a simple and desirable form of the invention as embodied in the illustrative construction and process, it will of course be understood that the foregoing is merely exemplary and not to be considered as limiting the invention thereto, and that various modifications with changes in method procedure and in the form and relation of machine parts may be made without departing from the scope of the invention.

Having thus described my invention, what I claim as new and desire to secure by Letters Patent of the United States is:—

1. The process of making aerial propellers of the described form, characterized by longitudinally removing or cutting surface portions of the blade bodies on the lines of successive transverse arcs of circles of different radii tangential to each other, while supporting the body as sections of a cylindrical body moved in relation to an adjustable cutting tool.

2. The process of making aerial propellers which consists in simultaneously forming the surfaces of a plurality of blade bodies arranged as sections of a cylindrical or conical body moved in relation to a machining tool and attaining variable thickness and widths of the blade bodies by disposing the inner surfaces of the same at an angle to the rotational axis of the cylindrical or conical body of which they are arranged as sections.

3. The process of making aerial propellers which consists in simultaneously forming the surfaces of a plurality of blade bodies arranged as sections of a cylindrical or conical body rotated in relation to a machining tool and rocking the blade bodies on support axes to positions allowing said tool to work on different surface portions thereof for cutting the same on the lines of the different tangential arcs.

4. The process of making aerial propellers which consists in simultaneously forming the surfaces of one or more blade bodies arranged as sections of a cylindrical or conical body rotative in relation to a machining tool and rocking the blade bodies on support axes to positions allowing said tool to work on different surface areas thereof for cutting the same on the lines of the different tangential arcs; variable thicknesses and widths of the blades being attained by setting the inner surfaces of the blade bodies at angles to the rotational axis of the cylindrical or conical body of which they are arranged as sections.

5. A device for making propellers of the character described, comprising means for rotating a propeller blank about an axis in cutting relation to a machining tool and means for adjusting the blank to different cut angles on a rocking axis while carried about the rotating axis.

6. A device for making propellers of the character described, comprising a support means carrying propeller blanks having a movement in relation to a machining tool and means for adjusting the blanks both longitudinally and transversely in angular relation to the axis of said support means while carried thereby, so as to vary their disposition of cut to said tool.

7. A device according to claim 6 wherein the support means for the blanks comprises annular plates secured in spaced relation on a driven shaft and tie-rod connections between said plates engaged into slots therein for adjustment securing at any desired inclination to said shaft.

8. A device according to claim 6 wherein the support means for the blanks comprises annular plates secured in spaced relation on a driven shaft and tie-rod connections between said plates movably secured in slots therein for adjustment at any desired inclination to said shaft; said connections serving to hold the blanks tiltable individually within said slots.

9. The method of forming the transverse outer-face curvature of propeller blades which consists in removing surface from the blank longitudinally along one edge portion thereof on the line of an arc of one circle centered in a longitudinal plane perpendicular to its transverse plane, removing surface from the center portion of the blank longitudinally flush with the first removal on the line of an arc of another circle of different radius centered in the same longitudinal plane and tangential to the first circle, and removing surface from the other edge portion of the blank longitudinally flush with the center removal on the line of an arc of a third circle of a radius different from both the other circles and tangential to each with centering also in said longitudinal plane.

10. The method of forming the transverse outer-face curvature of propeller blades, which consists in longitudinally removing surface from the blade blank on lines of successive transverse arcs of different extents and of different radii commonly centered on the opposite side in a longitudinal plane perpendicular thereto and blended or faired into a single variable curve.

THEODOR von KÁRMÁN.